H. A. MYERS.
METHOD AND APPARATUS FOR MAKING GLASS.
APPLICATION FILED DEC. 16, 1918.

1,413,766.

Patented Apr. 25, 1922.
2 SHEETS—SHEET 1.

Witnesses:
Robert H. Weir
Arthur W. Carby

Inventor
H. A. Myers
By Arthur F. Durand Atty.

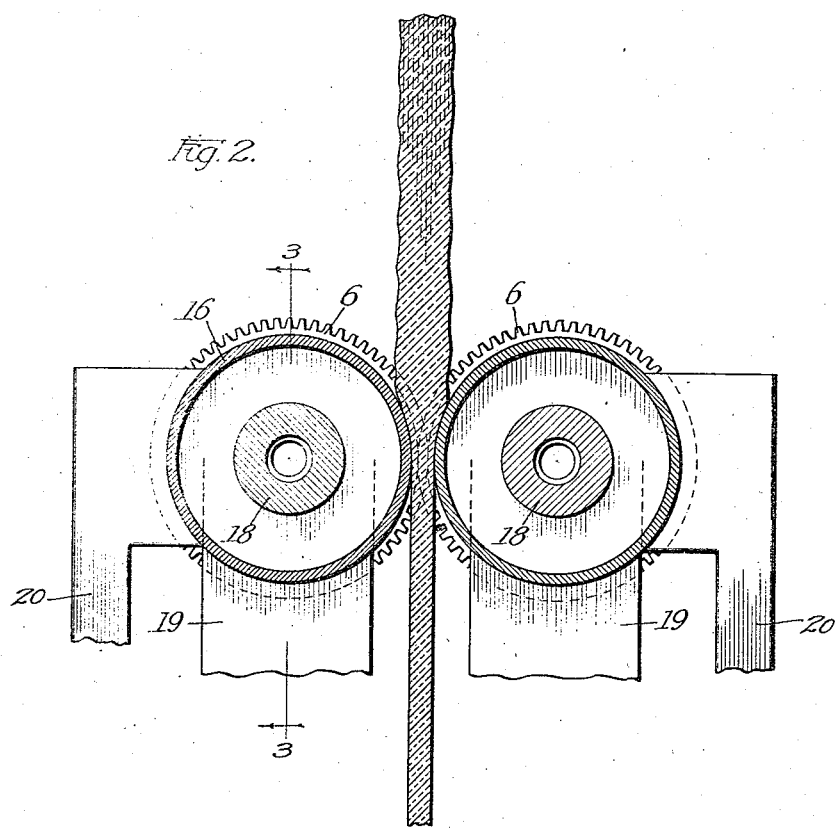
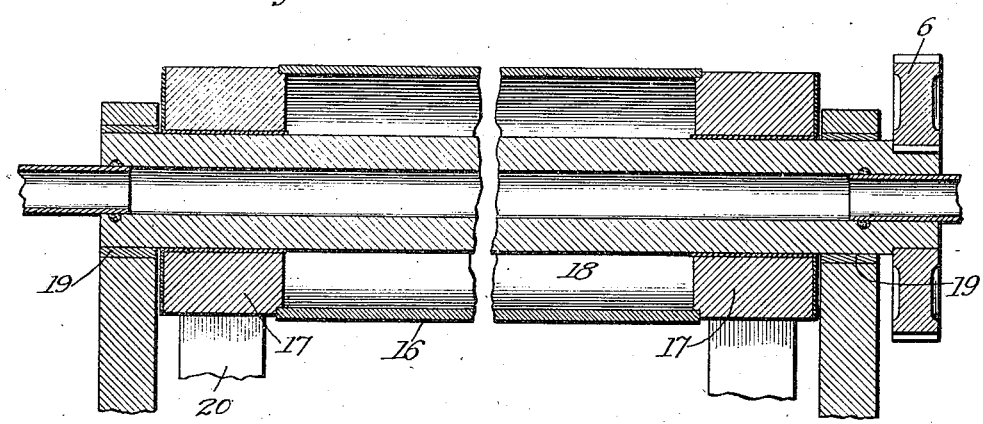

UNITED STATES PATENT OFFICE.

HUBERT A. MYERS, OF TOLEDO, OHIO, ASSIGNOR TO THE HUBERT A. MYERS COMPANY, OF TOLEDO, OHIO, A CORPORATION OF OHIO.

METHOD AND APPARATUS FOR MAKING GLASS.

1,413,766.  Specification of Letters Patent.  Patented Apr. 25, 1922.

Application filed December 16, 1918. Serial No. 266,855.

*To all whom it may concern:*

Be it known that I, HUBERT A. MYERS, a citizen of the United States of America, and a resident of Toledo, Ohio, have invented a certain new and useful Improvement in Methods and Apparatus for Making Glass, of which the following is a specification.

This invention relates to apparatus for making glass, and more particularly to the manufacture of sheet glass.

Generally stated, the object of the invention is to provide an effective and satisfactory method and apparatus for making glass, which will be economical in character, and which will tend to insure a comparatively high grade of glass at a lower cost of production than heretofore.

Another object is to provide an improved method and apparatus which will obviate the necessity of employing certain methods or features of construction heretofore considered necessary or desirable in the manufacture of glass.

Another object is to provide a method which will insure a high gloss or polish for the surface of the glass.

It is also an object to provide certain details and features of improvement tending to increase the general efficiency and the desirability of a glass making apparatus of this particular character.

To the foregoing and other useful ends the invention consists in matters hereinafter set forth and claimed and shown in the accompanying drawings, in which—

Fig. 2 is an enlarged cross section of the rollers which form the sheet of glass.

Fig. 3 is a vertical section on line 3—3 in Fig. 2.

Figure 1:
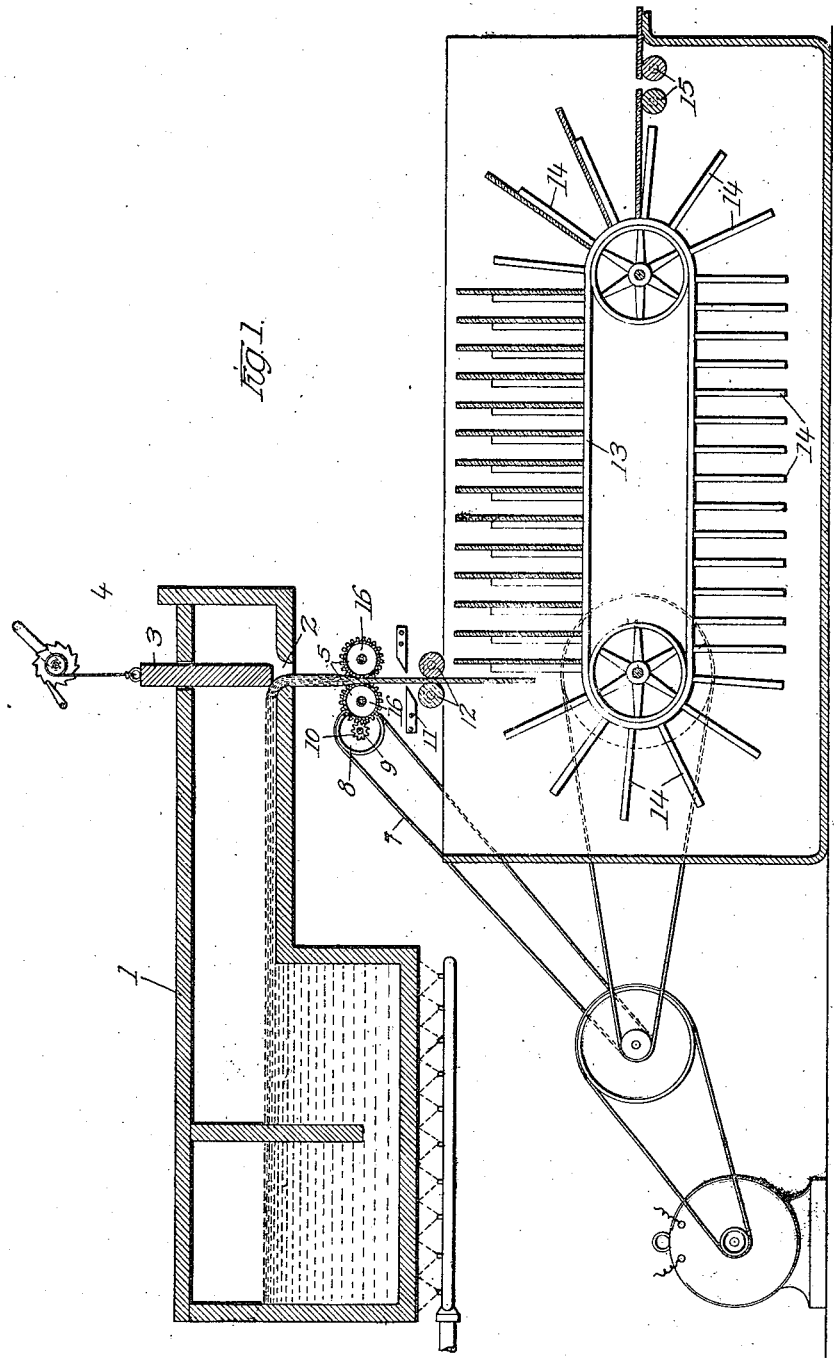
Fig. 1 is a diagrammatic view showing a glass making apparatus embodying the principles of the invention.

As thus illustrated, the apparatus comprises a furnace 1 for melting the glass, the heat being supplied in any suitable or desired manner, and the construction of the furnace may be of any suitable character. The molten glass overflows through an opening 2 which is controlled by a valve or gate 3, the latter being raised and lowered by mechanism 4 of any suitable or desired character. Forming rollers 5 are disposed below the discharge opening 2, said rollers being geared together by spur gears 6, and being driven at the required speed by a belt 7 which extends to the pulley 8 on the driving shaft 9, the latter having a pinion 10 which engages one of said gear wheels. Said belt 7 can be driven by any suitable motive power, it will be understood, as for example, by the electric motor shown. Knives 11 are provided for cutting off the sheet of glass, and guide rollers 12 feed the sheet onto the endless traveling carrier 13, which latter is provided with uprights 14 to hold the sheets of glass in upright position. This carrier 13 is also operated in any suitable or desired manner, or by power transmitted thereto from said motor. The sheets of glass are successively laid on the rollers 15 which feed the glass away in a horizontal plane; but it will be understood that any suitable means can be employed for receiving and conveying the sheets of glass away from the forming means.

The rollers 5 are preferably maintained at a sufficiently high temperature to melt the glass or to retain it in molten condition, thereby preserving the fluidity of the glass which is necessary at this point in order to insure a high gloss or polish for the surface of the glass. For example, the glass as it leaves the opening 2 may have a temperature of approximately 1100 degrees Fahrenheit, and the opposing surfaces of the rollers which form an opening or space between them for the glass may be maintained at a temperature of approximately 1500 to 1800 degrees Fahrenheit, so that the glass flows between the two rollers in a highly liquid condition, and whereby each roller is constantly supplied with a coating of molten glass. In this way, the sheet of glass which flows downward from between the two rollers does not come in direct contact with the rollers, but merely comes in contact with the film or coating of glass on the rollers, and in this way the method involves the separation of molten glass from molten glass, instead of the separation of glass from metal, and hence the sheet of glass is left with a naturally glazed or smooth surface having a high gloss or polish, just as a quantity of molten glass will have a high surface gloss or finish when allowed to cool without contact with other objects. For this purpose, the rollers 5 are only rotated fast enough to keep them glazed or coated with the molten glass, and the operation of the rollers can be timed and regulated for this purpose.

The heating of the rollers can be accomplished in any suitable or desired manner. For example, and as a matter of further and special improvement, each roller can be made of high resistance metal, such for example as nichrome, so that it will have the required surface temperature when heated. As shown in Figs. 2 and 3, each roller comprises a nichrome cylinder 16 suitably supported between brass rings 17 on the hollow shaft 18, said rings being insulated from said shaft in any suitable manner. Bearings 19 are provided for said shaft, and water may be circulated through the latter to keep the bearings and adjacent parts cooled; but the cylinder 16 of nichrome, or of other high resistance metal, is heated to such a high temperature that the glass is melted thereby, or retained in a melted condition, sufficiently so to keep each cylinder coated with a film or layer of melted glass. As previously stated, therefore, the sheet of glass in passing between the two rollers does not come in direct contact with the surface of the rollers, but merely comes in contact with the glass coating of each roller, the fluidity of the glass at this point being maintained for this purpose, whereby the surfacing of the glass sheet is accomplished naturally and without the necessity of any polishing or glazing means, the natural gloss of the glass when in highly molten condition being relied upon to provide the surface finish for the ultimate product. In other words, the molten glass in one sense drips or flows by gravity from the space or opening between the two rollers 5, and the liquid glass itself, when carried on the surfaces of the two rollers, forms the surfaces of the opposite sides of the space or opening, and renders the latter so slippery that the glass flows or passes downward practically without retardation or friction, just about as a current of water may flow on a still or stationary body of water. In other words, the liquid glass which adheres to the rollers lubricates the surfaces thereof, and enables the glass to flow freely and smoothly and to retain its highly glazed surface when cooled. In this way the size of the space or opening between the two rollers will depend upon the thickness desired for the sheet of glass, and will be equal to the combined thickness of the sheet of glass and the two films or coatings of glass on the rollers. The glass flows to the rollers at a temperature sufficient to maintain a free flow, and the rollers are maintained at a still higher temperature to produce the fluidity or highly molten condition of the glass that is necessary to keep the two rollers smoothly coated with glass, thereby insuring a sheet of glass of the desired quality. With this method, therefore, certain instrumentalities heretofore employed to surface or polish the surface of the glass, or to give it a smooth and glossy surface, are not necessary; and the method and apparatus shown and described are, therefore, intended and designed to make it possible to manufacture sheet glass of a comparatively high grade or quality at a lower cost of production than heretofore.

It will be understood, of course, that the knives 11 can be operated by any suitable, known or approved means, and that they can be timed in their operation to cut off the glass to form sheets of the desired size and shape. Also, the guide rollers 12 can be operated positively, if desired, by any suitable means, or may be employed merely as idlers to guide the downwardly moving sheet of glass.

It will also be understood that the instrumentalities for supplying electric current to the rollers, and for thereby heating the sides of the opening or space through which the sheet of glass passes may be of any suitable character. For example, the brushes or contacts 20 may be arranged to engage the brass rings 17, and these brushes can be included in a circuit which also includes a suitable source of current. It will be understood that this arrangement can be employed for each roller. But, of course, any suitable means can be employed for heating the rollers to the required temperature.

Thus the method or process shown and described involves the formation of an opening or space between the two opposing surfaces of molten glass, and these two opposing surfaces are kept moving, as by rotating rollers, in order to facilitate the departure of the sheet of glass by gravitational movement therefrom, in the manner explained, thus producing the high gloss or finish and the other results desired.

What I claim as my invention is:—

1. Apparatus for making glass, comprising means to provide a reservoir supply of molten glass, means to form an opening or space for shaping the glass, through which the discharge of glass flows in molten condition from said reservoir, and instrumentalities to maintain the sides of said opening or space at a sufficiently high temperature to retain the necessary fluidity of the glass, and so that the sides of the opening will remain glazed with the highly liquid molten glass which adheres thereto from the passing flow, together with means to keep said glazed sides moving with the flow of glass.

2. Apparatus as specified in claim 1, said means comprising a pair of rollers spaced apart to allow the glass to pass downwardly between them, said instrumentalities including electrical connections for including the rollers directly in circuit with a source of electric current, each roller being of high resistance material to generate the heat necessary to maintain the glass in molten condition on the surface thereof, and means for rotating said rollers as the glass passes between them.

3. Apparatus as specified in claim 1, said means comprising a pair of rollers spaced apart to permit the molten glass to pass downwardly between them, and means for rotating the rollers, said instrumentalities serving to keep each roller sufficiently heated to maintain the said coating of glass on the surface thereof.

4. The process of making glass, which comprises the formation of a space or opening between two surfaces of molten glass, and the passage of molten glass between said surfaces, while maintaining said surfaces at high temperature to prevent cooling of the glass, and keeping said surfaces moving with the flow of the glass, so that the sheet of glass is surfaced and highly glazed by the action of the molten glass which forms the opposite sides of the opening or space.

5. A process as specified in claim 4, in which said opposing surfaces of glass are kept revolving to facilitate the departure therefrom of the sheet of glass.

6. The process of making sheet glass, comprising the melting of the glass to the required degree of fluidity so that it will flow in liquid form in the desired manner, establishing a downward flow of the liquid glass by gravity, using some of the melted glass to form the sides of a narrow slot or space through which the glass must flow by gravity to form the sheet, maintaining the glass which forms the sides of said slot or space at substantially or practically the same degree of fluidity as the downwardly flowing liquid glass, so that the latter is not chilled when it encounters the sheet-forming slot or space, and keeping the sides of the slot moving with the flow of glass.

7. The process specified in claim 6, comprising the revolving of the liquid glass which forms the sides of the slot or space, to effect the said movement of the sides of the slot with the flow of glass, thereby to facilitate the separation of the glass sheet therefrom.

8. In apparatus for making sheet glass, the combination of means for melting the glass and reducing it to the desired degree of fluidity, means to establish a flow of the liquid glass by gravity, a pair of rollers spaced apart to provide a slot or space to receive the melted glass, means to maintain said rollers at a sufficiently high degree of temperature to maintain the glass in melted condition, so that some of the glass will adhere to the rollers and thus lubricate the sides of said slot or space to facilitate the downward flow of the glass, and to give the sheet a highly glazed surface.

9. A structure as specified in claim 8, in combination with supplemental guide rollers to receive the sheet from said first mentioned or forming rollers, and means for severing the sheet at a point between the two sets of rollers.

10. A structure as specified in claim 8, in combination with instrumentalities to support and receive the sheet as it moves downward by gravity in a vertical plane from said rollers.

11. Apparatus for making glass, comprising means to form an opening or space for shaping the glass, through which the glass flows in molten condition, and instrumentalities to maintain the sides of said opening or space at sufficiently high temperature to retain the necessary fluidity of the glass, so that the sides of the opening will remain glazed with molten glass, said means comprising a pair of rollers spaced apart to allow the glass to pass downwardly between them, said instrumentalities including electrical connections for including the rollers directly in circuit with a source of electric current, each roller being of high resistance material to generate the heat necessary to maintain the glass in molten condition on the surface thereof, and means for rotating said rollers as the glass passes between them.

12. Apparatus for making glass, comprising means to form an opening or space for shaping the glass, through which the glass flows in molten condition, and instrumentalities to maintain the sides of said opening or space at sufficient high temperature to retain the necessary fluidity of the glass, so that the sides of the opening will remain glazed with molten glass, said means comprising a pair of rollers spaced apart to permit the molten glass to pass downwardly between them, and means for rotating the rollers, said instrumentalities serving to keep each roller sufficiently heated to maintain the said coating of glass on the surface thereof.

13. The process of making glass, which comprises the formation of a space or opening between two surfaces of molten glass, and the passage of molten glass between said surfaces, so that the sheet of glass is surfaced and highly glazed by the action of the molten glass which forms the opposite sides of the opening or space, said opposing surfaces of glass revolving to facilitate the departure therefrom of the sheet of glass.

HUBERT A. MYERS.